United States Patent Office 3,702,858
Patented Nov. 14, 1972

3,702,858
HYDROCARBYL TIN CARBOXYLATE
Toshio Seki, Osaka, Yasuo Hiyama, Amagasaki, and Yoshitaka Sato, Moriguchi, Japan, assignors to Nitto Kasei Co., Ltd., Osaka, Japan
No Drawing. Continuation-in-part of application Ser. No. 879,977, Dec. 9, 1969, which is a division of application Ser. No. 615,895, Feb. 14, 1967, now Patent No. 3,511,803. This application Apr. 16, 1971, Ser. No. 134,844
Claims priority, application Japan, Feb. 15, 1966, 41/8,605
Int. Cl. C07f 7/22
U.S. Cl. 260—429.7                    3 Claims

ABSTRACT OF THE DISCLOSURE

Novel organotin compounds are provided for stabilizing synthetic resins against degradation by thermal oxidation, said compounds having the formula

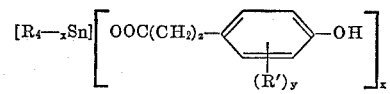

wherein R is selected from the group consisting of alkyl of from 1 to 18 carbon atoms, and benzyl, R' is tertiary butyl, $x$ is an integer of 1 to 3 inclusive, $y$ is 2, and $z$ is an integer of 0 or 2, at least one R' group being adjacent to —OH group in the phenolic group.

---

This application is a continuation-in-part of application Ser. No. 879,977, filed Dec. 9, 1969, and now abandoned, which in turn is a divisional application of application Ser. No. 615,895, filed Feb. 14, 1967, and now U.S. Pat. No. 3,511,803.

This invention relates to novel organotin compounds, to the preparation of such compounds, and to synthetic resins stabilized with said organotin compounds.

It is known that certain organic compounds may be added as antioxidants to synthetic resins which are subject to deterioration from heat. For example, phenols alkylated to protect phenolic groups, of relatively low molecular weight are used commonly as such antioxidants. However, these known antioxidants may be characterized by unsatisfactory stabilizing ability because of thermal decomposition, volatilization, and sublimation during the process of producing films, fibers, or other molded articles. In addition, poor compatibility of the antioxidants with synthetic resins may cause plating-out, blooming, or bleeding phenomenon.

According to the present invention, these adverse effects may be reduced or eliminated by employing a new class of organotin compounds as stabilizers.

It is an object of this invention to provide novel organotin compounds and methods of producing such compounds. A further object of this invention is to provide synthetic resins stabilized with one or more of these novel organotin compounds. Other objects will be apparent to those skilled-in-the-art from the following description.

In accordance with certain of its aspect, the method of this invention for stabilizing synthetic resins against degradation by thermal oxidation comprises incorporating with said resin an inhibiting amount of a compound having the following formula (I)

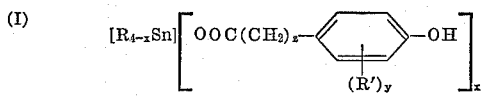

wherein R is selected from the group consisting of alkyl of from 1 to 18 carbon atoms, and benzyl, R' is tertiary butyl, $x$ is an integer of 1 to 3 inclusive, $y$ is 2, and $z$ is an integer 0 or 2, at least one R' group being adjacent to OH group in the phenolic group.

In accordance with certain aspects of this invention, organotin compounds included in Formula I may be prepared by heating a compound of the formula (a)

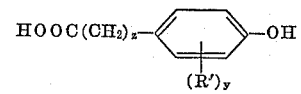

wherein $R_2$, $z$ and $y$ are as defined above with a tri-, di-, or mono-organotin oxide (or alkoxide) in an inert solvent medium such as benzene, toluene, etc. Other compounds within the general Formula I may be prepared by heating an alkali metal salt of carboxylic acid of Formula (a) with an organotin halide in alcohol, benzene, or toluene, and removing the formed alkali metal halide from the reaction system.

The following examples are exemplary of ways of preparing the new compounds, in accordance herewith.

EXAMPLE A

Preparation of dibutyltin bis(3,5-di-tertiary butyl-4-hydroxy benzoate)

A mixture of 24.9 g. of dibutyltin oxide (0.1 mole), 50.1 g. of 3,5-di-tertiary butyl-4-hydroxy benzoic acid (0.2 mole) and 300 cc. of benzene was heated under reflux until the theoretical amount of water was removed by azeotropic distillation. The final reaction mixture was a clear solution. Evaporation of the benzene gave the product as a solid.

EXAMPLE B

Preparation of dibutyltin bis(β-3,5-di-tertiary butyl-4-hydroxy phenyl propionate)

A mixture of 24.9 g. of dibutyltin oxide (0.1 mole), 55.7 g. of β-3,5-di-tertiary butyl-4-hydroxy phenyl propionic acid (0.2 mole) and 300 cc. of toluene was heated under reflux until the theoretical amount of water was removed by azeotropic distillation. The final reaction mixture was a clear solution. Evaporation of the toluene gave the product as a solid.

EXAMPLE C

Preparation of dioctyltin bis(β-3,5-di-tertiary butyl-4-hydroxy phenyl propionate)

41.6 g. of dioctyltin dichloride (0.1 mole) and 60.1 g. of sodium β-3,5-di-tertiary butyl-4-hydroxy phenyl propionate (0.2 mole) was stirred in refluxing toluene (400 cc.). After 2 hours, the deposited salt is removed by filtration and the solvent distilled off to yield dioctyltin bis(β-3,5-di-tertiary butyl-4-hydroxy phenyl propionate) as a solid.

The novel organotin compounds obtained of this invention may be colorless to light yellow, crystalline or non-crystalline substances, depending upon the R and R' radicals, and the value of $x$, $y$, and $z$ in the general Formula I. The compounds may be soluble in those general organic solvents which have a boiling point in the range of 40° to 300° C., e.g. aromatic hydrocarbons, alcohols, ethers, esters, ketones, petroleum hydrocarbon, etc.

Typical examples of compounds of Formula I are:

(1)

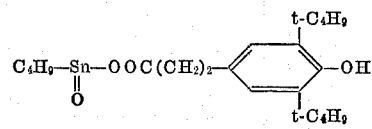

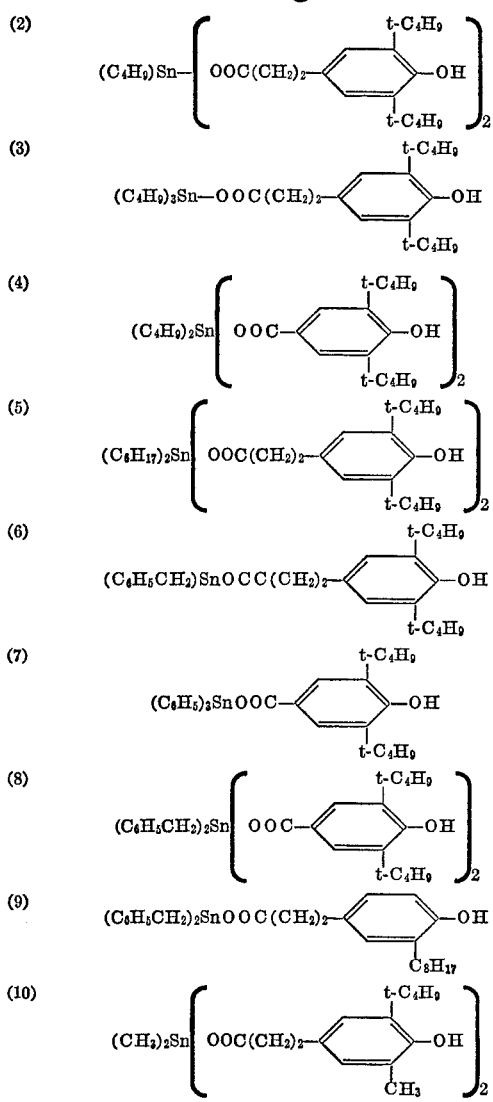

wherein *t* stands for tertiary.

The low volatility of these organotin compounds may be known in the following table designated as Table I:

Table I

| Organotin compound | Percent weight loss by heating at 180° C. for 10 minutes |
|---|---|
| 1 | 4.90 |
| 2 | 2.70 |
| 3 | 1.85 |
| 4 | 2.88 |
| 5 | 0.06 |
| 6 | 0.14 |
| 7 | 1.33 |
| 8 | 0.89 |
| 9 | 0.45 |
| 10 | 3.56 |
| 2,6-di-tertiary-butyl-4-methyl phenol | 36.30 |

These organotin antioxidants and stabilizers may be combined with or incorporated into the synthetic resins in several ways. For instance, the organotin compound or mixture of compounds may be added to the synthetic resins prior to polymerization. After the addition of the organotin compound, the admixture may be polymerized and molded nito films, fibers, or other articles. Alternatively, the organotin compound may be added to the synthetic resin together with other additives such as another stabilizer, an ultraviolet light absorber, a coloring agent, a mold lubricant, etc. by mixers, e.g. a ribbon blender, a high-speed mixer, etc. after which the mixture may be molded into films, fibers, or other articles.

Only an inhibiting amount of organotin compound is required. Preferably, the amount of the organotin stabilizers and antioxidants to be employed in the process of this invention is in the range of 0.01% to 5% by weight based on the weight of the synthetic reisns, which will vary depending upon the kind of molded articles and the manner in which the organotin compounds are added.

The organotin compounds of this invention are especially useful in the production of the synthetic resins when these resins are molded or polymerized at a relatively high temperature. Often conventional stabilizers and antioxidants sublime from resins at temperatures above 170° C., and the amount used must be increased to be effective. Said organotin compounds are also profitable in that the effects of a plurality of said organotin compounds and already known stabilizers are synergistic in their stabilizing effects: said organotin compounds with sulfur-containing compounds as a peroxide decomposer on polyolefin, and said organotin compounds with dibutyltin or dioctyltin compounds, metallic soaps, or lead compounds as a vinyl chloride resin stabilizer.

The synthetic resins which may be stabilized by the method of this invention include ABS (Acrylonitrile-Butadiene-Styrene) resins, acetal resins, fluoroplastics, acrylic resins, alkyd resins, amino resins, urethane resins, epoxy resins, polyamide resins, polycarbonates, polyolefins, polystyrenes, vinyl choride resins, synthetic rubbers, etc.

EXAMPLE 1

Nought point two percent by weight of dibutyltin-bis-(β-3,5-di-tertiary butyl-4-hydroxy phenyl propionate) [of aforesaid Formula 2] as an antioxidant was added to polyvinyl chloride resin composition containing 2% by weight of dibutyltin maleate as a stabilizer, and 2% by weight of butyl stearate as a mold lubricant, and after milling for 15 minutes on a mixing roll at surface temperature of 160° C. the mixture was made into a sheet 1 mm. thick. The sheet was then put in a Geer oven at 180° C. for 80 minutes for the heat stability test. The same tests for heat stability were directed to a comparison sheet without the addition of an antioxidant, and one with 0.2% by weight of 2,6-di-tertiary butyl phenol as an antioxidant. In like manner where such tests made for sheets with tri-basic lead sulphate in place of dibutyltin maleate as a stabilizer. This data is listed on the following table for the different combinations of stabilizing agents.

TABLE II

| Stabilizer | Antioxidant | Initial color | Color after 40 minutes | Color after 80 minutes |
|---|---|---|---|---|
| Dibutyltin maleate | None | Light yellow | Yellow | Light brown |
| Do | 2,6-di-t-butyl-4-methyl phenol | Colorless | Light yellow | Yellow |
| Do | Compound of Formula 2 | do | Colorless | Light yellow |
| Tri-basic lead sulphate | None | White | Light yellow | Brown |
| Do | 2,6-di-t-butyl-4-methyl phenol | do | do | Light brown |
| Do | Compound of Formula 2 | do | White | White |

EXAMPLE 2

A two-component synergistic antioxidation mixture of 0.2% by weight of dioctyltin-bis-(β-3,5-di-tertiary butyl-4-hydroxy phenyl propionate) [of aforesaid Formula 5] and 0.4% by weight of dilaurylthiodipropionate was added to polyethylene, and after milling for 10 minutes on a mixing roll at surface temperature of 180° C. the mixture was made into a sheet 1 mm. thick. The sheet was then pressed at 130° C. to get even surface, and was put in a Geer oven at 140° C. for the heat stability test. Comparison sheets with the addition of a single antioxidant of dioctyltin-bis-(β-3,5-di-tertiary butyl-4-hydroxy phenyl propionate), and without any antioxidant were put to the same tests. Results are shown in Table III.

TABLE III

| Antioxidant | After— | | | |
|---|---|---|---|---|
| | 20 hours | 100 hours | 400 hours | 600 hours |
| None | Cracked | Cracked | Cracked and yellowed. | Cracked and yellowed. |
| Dioctyltin-bis-(β-3,5-di-tertiary butyl-4-hydroxy phenyl propionate). | Not deteriorated. | Not deteriorated. | Not deteriorated. | Cracked. |
| Dioctyltin-bis-(β-3,5-di-tertiary butyl-4-hydroxy phenyl propionate) and dilaurylthiodipropionate. | do | do | do | Not deteriorated. |

EXAMPLE 3

Propylene sheets were tested for heat stability as in Example 2. Results are shown in Table IV.

TABLE IV

| Antioxidant | After— | | | |
|---|---|---|---|---|
| | 20 hours | 100 hours | 400 hours | 600 hours |
| None | Cracked | Cracked | Cracked | Cracked. |
| Dioctyltin-bis-(β-3,5-di-tertiary butyl-4-hydroxy phenyl propionate). | Not deteriorated. | Not deteriorated. | do | Do. |
| Dioctyltin-bis-(β-3,5-di-tertiary butyl-4-hydroxy phenylpropionate) and dilaurylthiodipropionate. | do | do | Not deteriorated. | Not deteriorated. |

EXAMPLE 4

ABS resin containing 0.5% by weight of dibutyltin-bis-(3,5-di-tertiary butyl-4-hydroxy benzoate) [of aforesaid Formula 4] as stabilizer was injection molded into a flat plate 2 mm. thick by conventional method. During the process said ABS resin composition was subjected to heat at 190° C. for 6 minutes. The plate obtained white was put in a Geer oven at 180° C. for 90 minutes with the result of no discoloration.

For purposes of comparison, a flat plate of ABS resin without the addition of any stabilizers, and a plate with 0.5% by weight of 2,6-di-tertiary butyl phenol as stabilizer were tested for heat stability by the same procedure as above. The former became yellow immediately after injection molded, and became brown after 60 minutes in a Geer oven. The latter was white immediately after injection molded, and became light yellow after 30 minutes in a Geer oven, yellow after 60 minutes, and brown after 90 minutes.

EXAMPLE 5

Polystyrene containing 0.6% by weight of dibutyltin-bis-(3,5-di-tertiary butyl-4-hydroxy benzoate) [of aforesaid Formula 4] as stabilizer was injection molded into a flat plate by conventional method heat carrer of 180° C./5 minutes). The plate obtained was colorless and transparent, and was not discolored after being allowed to stand in a room for two years. A flat plate of polystyrene without the addition of any stabilizer, which was prepared by the same procedure as above for comparison was clear light yellow in color when molded, and turned yellow with markedly lowered transparency after being allowed to stand in room for two years.

EXAMPLE 6

To polycarbonate was added 0.5% by weight of dioctyltin-bis-(3,5-di-tertiary butyl-4-hydroxy benzoate). The composition was injection molded into a disk by conventional method. In this case the polycarbonate composition was exposed to heat at 260° C. for 10 minutes. The disk obtained was colorless and transparent. For comparison, a disk of polycarbonate without any additives was prepared under similar conditions. The disk obtained was light brown.

EXAMPLE 7

One hundred parts of polyoxypropylene triol (GP-3025, Mitsui Chem. Ind. Co., Ltd., Japan),
0.35 part of stannous octoate (T-9, M&T Chemicals Inc.),
1.5 parts of surface active agent (L-520, Union Carbide Corporation),
0.1 part of triethylenediamine (DABCO, Foundry Process & Chemical Company),
4.5 parts of water, and
0.08 to 0.8 part of dibenzyltin-bis-(β-3,5-di-tertiary butyl-4-hydroxy phenyl propionate)

were mixed thoroughly with gentle stirring, and 54.5 parts of tolylene diisocyanate (80/20) added with vigorous agitation. When the mixture began to foam, it was poured into a corrugated cardboard container. The foamed polyurethane was then exposed to sunlight and weathering outdoors, and the color of the foam was observed with the result as follows.

TABLE V

| Conc. of antioxidant (part) | Exposed for— | |
|---|---|---|
| | 3 days | 7 days |
| Blank | Yellow | Yellowish brown. |
| 0.08 | Light yellow | Light yellow. |
| 0.16 | White | Do. |
| 0.40 | do | White. |
| 0.80 | do | Do. |

Although this invention has been illustrated by reference to specific examples, numerous changes and modifications thereof which clearly fall within the scope of the invention will be apparent to those skilled-in-the-art.

We claim:
1. A compound of the formula

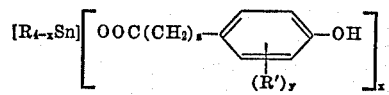

wherein R is selected from the group consisting of alkyl of from 1 to 18 carbon atoms, and benzyl, R' is tertiary butyl, $x$ is an integer of 1 to 3 inclusive, $y$ is 2, and $z$ is an integer 0 or 2, at least one R' group being adjacent to —OH group in the phenolic group.

2. A compound of the formula
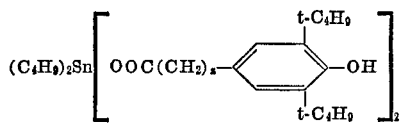
wherein z is the integer 0 or 2.
3. A compound of the formula
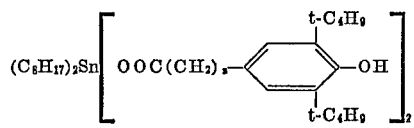
wherein z is the integer 0 or 2.
References Cited
UNITED STATES PATENTS
3,031,483   4/1962   Koopmans et al. ___ 260—429.7
2,826,597   3/1958   Gloskey _____ 260—429.7
JAMES E. POER, Primary Examiner
W. F. W. BELLAMY, Assistant Examiner
U.S. Cl. X.R.
260—45.75 K